United States Patent [19]

Zacuto

[11] Patent Number: 4,718,708
[45] Date of Patent: Jan. 12, 1988

[54] TOOL PRODUCT AND METHOD OF MAKING

[76] Inventor: Victor Zacuto, 5705 Bevis Ave., Van Nuys, Calif. 91411

[21] Appl. No.: 651,072

[22] Filed: Sep. 17, 1984

[51] Int. Cl.⁴ ............................ A01B 1/22; B25G 3/02
[52] U.S. Cl. .................................... 294/57; 16/110 R; 76/113; 294/49
[58] Field of Search ............................ 294/49, 55, 57; 16/110 R; 72/367, 369; 76/111, 113

[56] References Cited

U.S. PATENT DOCUMENTS

| | | | |
|---|---|---|---|
| 1,696,251 | 12/1928 | Penney | 72/369 |
| 2,380,361 | 7/1945 | Harte | 294/49 X |
| 2,399,800 | 5/1946 | Harte | 294/49 X |
| 2,966,379 | 12/1960 | Ingersoll | 294/49 |
| 3,042,099 | 7/1962 | Neely | 72/369 |
| 3,100,665 | 8/1963 | Duppengiesser | 294/57 |

FOREIGN PATENT DOCUMENTS

| | | | |
|---|---|---|---|
| 963307 | 2/1975 | Canada | 294/57 |
| 13511 | of 1907 | United Kingdom | 76/113 |
| 856541 | 12/1960 | United Kingdom | 294/57 |
| 1573403 | 8/1980 | United Kingdom | 294/57 |

*Primary Examiner*—Johnny D. Cherry
*Attorney, Agent, or Firm*—Frank L. Zugelter

[57] ABSTRACT

A hand tool, such as a shovel, having unique working head or blade and shank elements. The blade includes a dished panel transversely disposed from its longitudinal axis and flaring from rear to working end. The trough of the blade is shallower at its distal or working end than at its rear end at which the shank is secured such as by welding. The shank is of a single-walled tubular construction and includes a cut, pinched, angled end which is welded to the rear of the blade, a buckled, curved portion extending from such securement to a straight portion integrally continuing from such buckled and curved portion, to an expanded hub swedged contiguous to the other end of the shank. A tapered handle fits to and through such hub, secured by a rivet to the shank. A plane of symmetry extends throughout the tool. The invention includes method for forming tool, blade, and shank.

7 Claims, 27 Drawing Figures

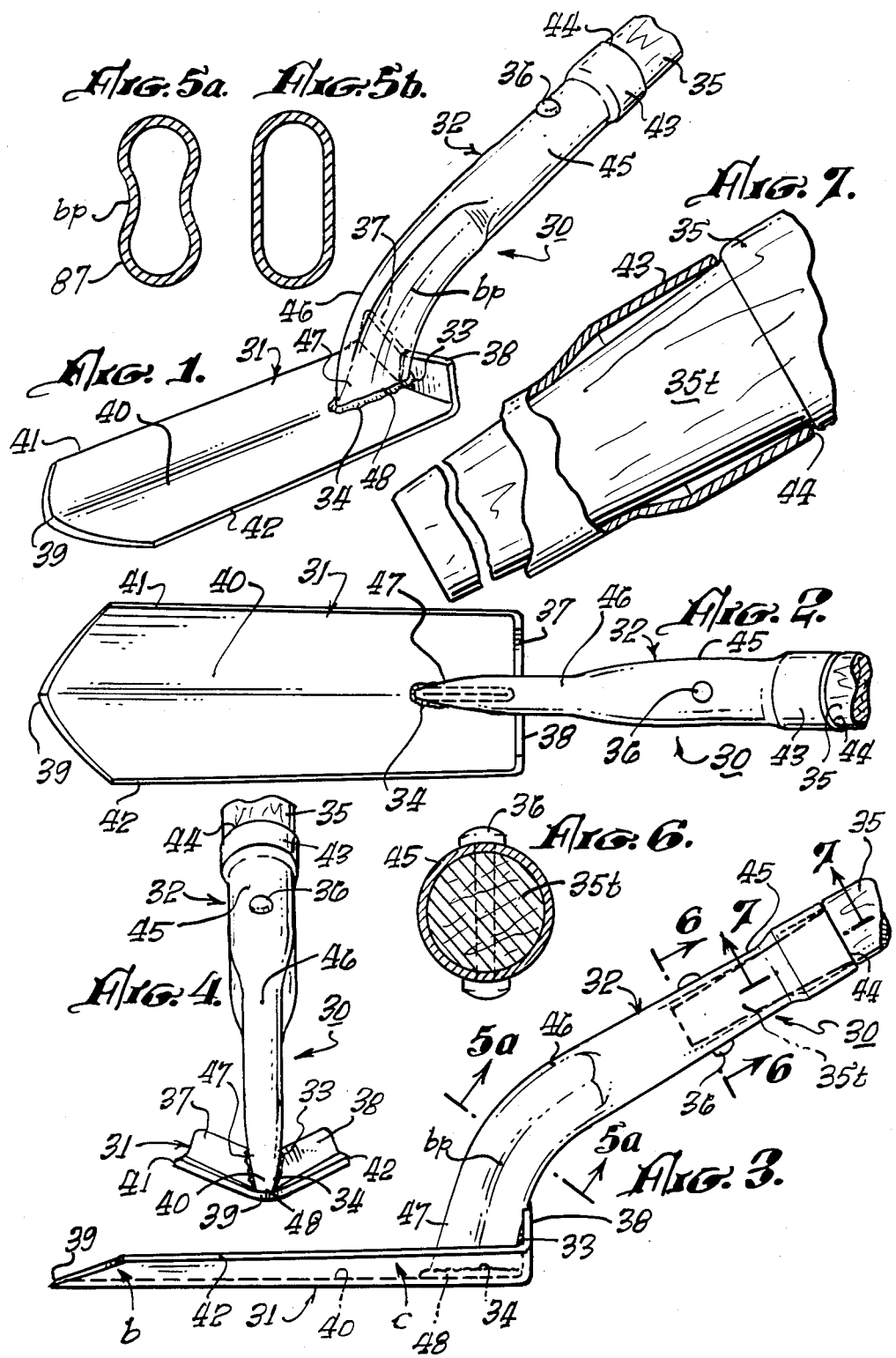

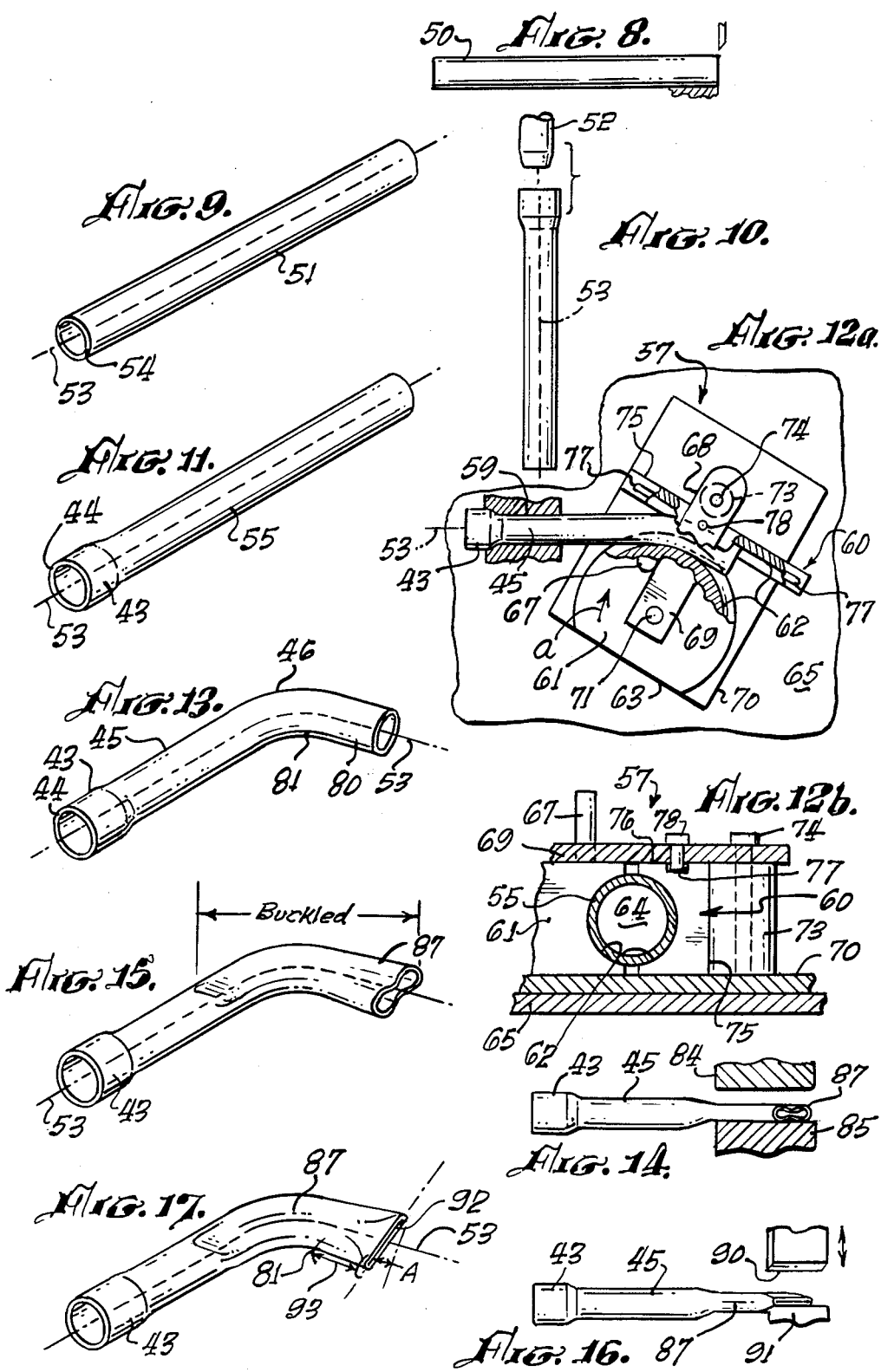

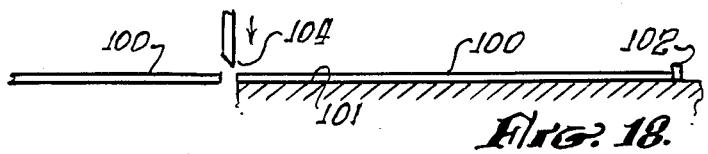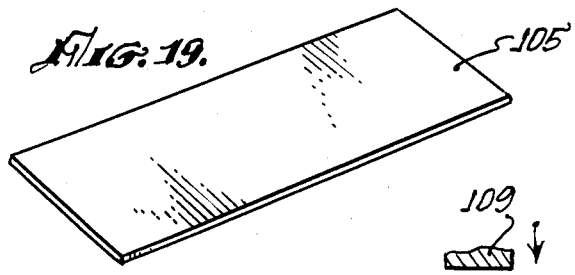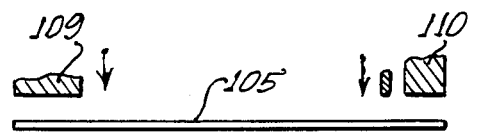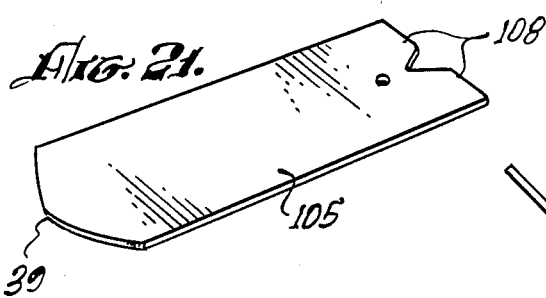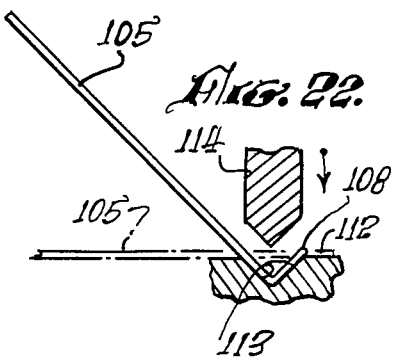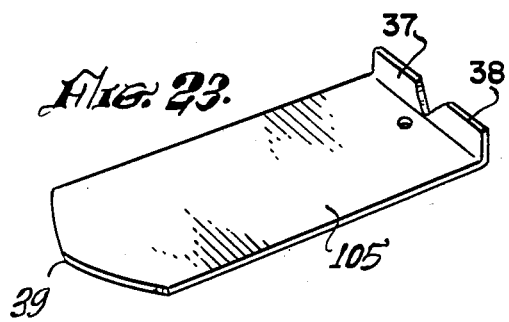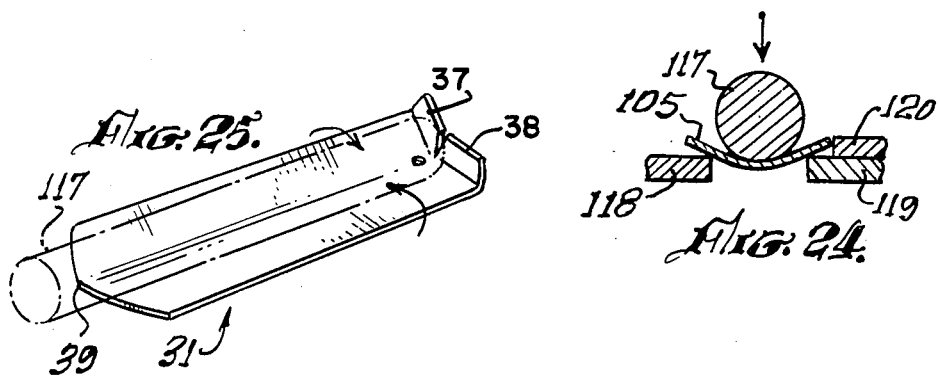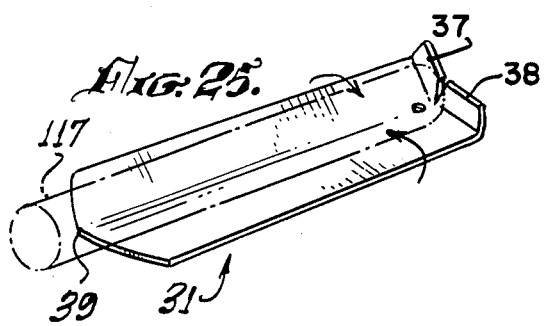

TOOL PRODUCT AND METHOD OF MAKING

TECHNICAL FIELD

This invention pertains to manual or hand working tools and implements, and is particularly directed to a unique shovel and its method of manufacture.

BACKGROUND ART

Examples of disclosures of the type of tool or implement of a class of art in which the present invention generally would reside are to be found in the following prior art teachings: U.S. Pat. Nos. 1,970,137; 2,380,361 2,399,800; 2,399,802; 3,009,726; and 3,767,249.

DISCLOSURE OF THE INVENTION

Brief Summary

This invention is directed to a hand tool having a single walled construction in its shank that is secured to a working head or blade at its one end and secured to a handle at its other end.

The single walled construction of the shank is fabricated from a length of metal tubing on which various steps are taken to so fabricate. These steps include swedging its one end to form a hub into which a tapering portion of a wooden handle is thrust, bending an unswedged portion of the tubing to form a curved portion not contiguous to the hub or to the other end of the tubing, buckling such curved portion and a retained length of tubing at such other end to a point where more than just a flattened appearance occurs, cutting the end opposite the hubbed end at an angle to provide a suitable lift to the tool for the operator and pinching together such end across the cut to produce a straight edge and peripheral length readily securable, such as by welding, to the blade. The steps of the method are taken generally with a plane of symmetry of the tool in mind, i.e., symmetry about a vertical plane passing through the longitudinal axes of blade, shank and handle remains after the steps of fabrication take place.

As to making the working head or blade, a suitable plate is cut to size, front and rear ends thereof then being fabricated, a flange produced at the rear end of the blade, and then a dish effect across the width of the plate is made in one step, an advantageous result of which being, to provide a trough which deepens in the direction towards the blade's rear.

Problems In the Art and Advantages Thereover

One problem in fabrication existing in the prior art is to provide shank strength. One solution has been to kink along its length a dual-walled (two tubes) construction, such as disclosed in U.S. Pat. No. 3,767,249. However, in this invention, a curving segment or portion is provided in a single-walled shank, as distinguished from a kink for the shank which requires two telescope tubes and as disclosed in U.S. Pat. No. 3,767,249. Further, the shank is buckled to form a figure-eight cross-sectional configuration, which provides additional strength over an oval configuration to the tool, against various loads of leverage presented to the blade.

There are other advantages of the instant invention. Without the hub, a bigger tube is required for strength in the shank, with desired heaviness in weight and higher costs otherwise present. The captivation of a tapering handle in the smaller tubing beyond the hub together with the largeness of the hub's configuration provides two dimensions of strength for the handle, i.e., the bending pressure by the handle is not captured solely by a tubing without a hub. No ridge on the handle's configuration, separating the tapering portion from the handle proper, is necessary to be formed. The hub and tubing beyond it together add strength to tapering or conforming configurations for the handle.

OBJECTS OF THE INVENTION

An object of this invention is to provide novel method of manufacture for a working head, for a shank, and for their combination, as applied to a hand tool.

Another object of the invention is to produce a strong shank having less material, thereby decreasing its weight and its manufacturing cost to the user and maker.

Another object of this invention is to provide a novel shank, working head, and tool.

These and other objects of the invention will become more apparent upon a complete and full reading of the following description, appended claims thereto, and the accompanying drawing comprising three (3) sheets.

BRIEF DESCRIPTION OF THE DRAWING

FIG. 1 is a perspective view of subject matter embodying the invention.

FIG. 2 is a top plan view of the FIG. 1 subject matter.

FIG. 3 is a side elevational view of the FIG. 1 subject matter.

FIG. 4 is an end view of the FIG. 1 subject matter, viewed from the shovel blade's working end.

FIG. 5a is a view taken on line 5a—5a of FIG. 3.

FIG. 5b is an oval cross-section of tubular stock.

FIG. 6 is a view taken on line 6—6 of FIG. 3

FIG. 7 is a view taken on line 7—7 of FIG. 3.

FIGS. 8,10,12a,12b and 14 schematically represent steps taken in the process of forming the tool's shank.

FIGS. 9, 11, 13 and 15, respectively, schematically represent the resulting formation on the tubular stock out of which the tool's shank is formed after completion of the forming steps illustrated by FIGS. 8,10,12a,12b and 14.

FIGS. 16,18,20,22 and 24 schematically represent steps taken in the process of forming the tool's working head.

FIGS. 17,19,21,23 and 25, respectively, schematically represent the resulting formation on the element out of which the tool's working head is formed after completion of the forming steps illustrated by FIGS. 16,88,20,22 and 24.

BEST MODE OF CARRYING OUT THE INVENTION.

Referring now to the drawing wherein reference characters refer to like numerals hereinafter following, a hand tool 30, here in the form of what is commonly referred to as a shovel, is illustrated in FIG. 1. It is to be understood that the invention and its practice is not limited to just a shovel, but extends to other tool implements as well.

Tool 30 comprises, FIG. 1, a working head or blade 31, a shank 32 secured at 33, 34, FIGS. 1,4, to blade 31, and a handle 35 suitably secured, as by a means such as a rivet 36 extending through it, to shank 32 as shown in FIGS. 1–3. Shank 32 and handle 35, with its tapered portion 35t, are disposed in longitudinal arrangement with the longitudinal axis of blade 31, FIG. 2, while also angularly displacing from the line of such axis of blade 31, FIG. 3, such displacement being generally known in the art. Flanges 37, 38 are provided at the rear of blade 31 for foot engagement in known working sequence by the workman using tool 30. A working or digging edge 39 is provided at the front of blade 31, and as the face of blade 31 extends rearwardly towards its flanges 37, 38, a trough 40 over such face exists, it being shallower at working edge 39 than at flanges 37, 38. In other words, trough 40 deepens, front to rear. Such trough and deepening effect occurs during one of the steps forming blade 31. Blade 31 is further identified by a pair of opposing side edges 41, 42, best seen in FIGS. 1, 2, which flare in lateral directions, i.e., transversley from the blade's longitudinal axis, such flare becoming greater as such side edges 41, 42 approach working edge 39. Such flare provides for efficacy in collecting larger amounts of soil upon the blade's face, while the deepening of trough 40 towards flanges 37, 38 provides a larger pocket for such collection of soil. The advantage is that a lesser number of times of deployment of blade 31 is required in its operation for a given amount of soil to be removed. The same step that is used to form trough 40 provides for this flare, and the result is a dished effect for blade 31 also.

Shank 32 is formed from single walled tubing severed from stock material, and is suitably sized diametrically and dimensioned in its length. Shank 32 comprises a hub 43 formed along a length contiguous to an upper end 44 for the shank, a straight or retained tubular portion 45 extending downwardly from hub 43, a curved segment or portion 46 extending downwardly from retained tubular portion 45, such curved segment 46 being symetrically buckled along with a remaining length 47 contiguous to a lower end 48, FIGS. 1, 3, 4 for shank 32. Lower end 48 is cut at an angle A, FIG. 17, from a line perpendicular or normal to the axis of the tubing at the location of such cut, and is secured to blade 31. Curved portion 46 and remaining length 47 are buckled in the fabrication of shank 32, a figure-eight cross-sectional outline occurring.

STEPS FORMING THE SHANK

Referring now to FIGS. 8-16, a length 50 of metal tubing stock is cut to a desired length, FIG. 8, from which shank is fabricated. Length 50 may be cold sawed in conventional manner to arrive at a hollow tubular member 51, FIG. 9, or a manufacturer of the tubing stock may provide such desired length 50 for each member 51, rather than one having to perform this step of cold saw cutting to the desired length.

The next step provides for the formation of hub 43. Hollow member 51 is suitably secured (not shown), FIG. 10 in a conventional hydraulic press apparatus which includes an expander or punch member 52 in alignment with the major axis 53 of secured hollow member 51. Apparatus expander 52 is of a diameter greater than the internal diameter of hollow member 51. Actuation of the press apparatus causes expander 52 to descend into and through one end 54, FIG. 9, of hollow member 51, to swedge a portion of such hollow member contiguous to such end 54, thereby forming hub 43 of a suitable depth, FIG. 11, having end 44 thereon. The remainder of hollow member 51 constitutes an unswedged tubular portion 55, FIG. 11, part of which is utilized in the following described step for forming curved portion 46.

Tubular portion 55 is introduced, FIG. 12a, 12b, into a conventional hydraulic tube bending apparatus 57 to form curved portion 46, FIG. 13, out of part of it. Curved portion 46 is separated from hub 43 by retained tubular or straight portion 45.

A brief description of a conventional bending apparatus 57 is described, to an extent that includes adaptation of such apparatus to the bending step on tubular portion 55.

Hub 43 and tubular portion 45 contiguous thereto are suitably and securely clamped as at 59, FIG. 12a, while a part of tubular portion other than retained portion 45 is fit between a sliding wiper member 60 and a solid disk member 61 of apparatus 57. Its operation bends tubular portion 55, resulting in the fabrication shown in FIG. 13 and which includes retained portion 45. Wiper 60 and disc 61 include surfaces 62, which conform to and engage the tubular configuration of the outer surface of the wall of tubular portion 55. Disk 61 includes a flat wall 63 through its thickness that is presently directly across from or in front of surface 62 of wiper 60 in order to insert into and past the disc and wiper members the hub 43, which requires an opening larger than opening 64, FIG. 12b. Opening 64 is dimensioned for the tubular portion 55. Thus, now hub 43 and tubular portion 55 can be clamped as at 59 suitably secured to a work table 65. A plug (not shown in FIG. 12a) is thrust through hub 43 and across the width of clamp 59 to prevent a change in the round circumferences of the tubing's length at the clamping station, the plug generally conforming to the tubing's interior wall.

In such a clamped condition for the partially fabricated shank of FIG. 11, a finger handle 67, FIG. 12b, secured to disc 61, turns the latter in the direction of the arrow a, FIG. 12a, so that flat wall 63 rotates out of the way while its configuration 62 is presented to the wall of tubular portion 55 as shown in FIG. 12b. Finger handle 67, FIG. 12b, is revolved until it abuts an edge 68, FIG. 12a, of a flat bar 69, between which and a base plate 70, the disc 61 and wiper 60 are disposed and mounted. The inner ends of bar 69 and base plate 70 rotate about the axis of a bolt 71, secured to worktable 65, as does disc 61. Disc 61 freely rotates on base plate 70 and flat bar 69. A roller 73 is mounted by means of an axially-aligned bolt 74 between and adjacent to the outer ends of base plate 70 and bar 69, to cooperate with a rigid backside 75 of wiper 60 in the operation of apparatus 57. A topside 76 of wiper 60, FIG. 12b, includes an elongated, longitudinal slot 77 in which a stem of a bolt 78 mounted in bar 69, slides in such operation. The axes of bolt 71, roller 73, and bolt 78 lie in the same plane.

In such operation, clamp 59 is actuated against hub 43 and its contiguous tubular portion 55, to clamp the partially fabricated shank shown in FIG. 11. Bending apparatus 57 is actuated in known manner, such as by gearing below worktable 65 and being operatively connected to base plate 70. Base plate 70 and bar 69 now rotate about bolt 71. As this occurs, bolt stem 78 revolves about bolt 71 and slides along its slot 77 in topside 76 of wiper member 60, the latter correspondingly rotating about bolt stem 78 while being constrained partially by and to the radius length measured between bolt 71 and bolt stem 78. Also, freely rotating roller 73 simultaneously constrains movement of wiper element 60 to such radius length so that the net effect of the total movement of roller 73 and wiper member 60 is to bend or curve continuous cross-sectional segments of the wall of tubular portion 55 as surface configurations 62 of both disc and wiper grasp such wall segments as base plate 70 and bar 69 rotate about bolt 71. The resulting fabrication is shown in FIG. 13.

A remaining length 80, FIG. 13, extending longitudinally of such fabrication results after the bending step. Remaining length 80 has not been bent in the bending step and is actually a length of the original tubular stock material. It extends from the terminus of lower end 48 of the shank but in the partially fabricated shank of FIG. 13 to the terminus 81, FIG. 17, for curved portion 46. The purpose of this remaining length 80 will become apparent hereinafter. The fabrication shown in FIG. 13 is subjected to a pressing step, FIGS. 14, 15, whereby substantially the cross-sectional configuration of FIG. 5a is achieved, and which can be described and identified as a buckled state developed at this stage of fabrication. Axis 53 of the FIG. 13 shank is substantially held perpendicular to the direction of thrust for a descending hammer 84, FIG. 14, of a conventional punch press, while retaining length 80 and curved portion 46 lie on an anvil or flattening bar 85 of the press. Anvil and flattening bar are at least the tubular dimension of the shank. Hammer 84 is caused to descend a desired distance towards the press's anvil 85 and between which the curved portion 46 and annular length 80 are mashed, to arrive at the buckled state or portion 87, FIG. 13, and also shown in the FIG. 5a cross-sectional configuration. FIG. 5b is presented to illustrate that the mashing of these elements is such that the oval cross-sectional appearance of FIG. 5b is surpassed in such mashing. And yet this step does not break the wall of the stock material. The wall remains integral throughout its body of thickness, clearly observable in FIG. 5a.

With the partially fabricated shank of FIG. 15 in hand, a cut across the buckled portion 87 is effected, FIGS. 16, 17. An angle A, FIG. 17, one side of which is normal to axis 53, is suitably chosen prior to such cut for the purpose of providing a proper lift to the finished article, here, a shovel tool 30, so that trenching performed by the workman is done with the greatest of ease. A conventional shearing apparatus having a shearing edge 90, FIG. 16, is utilized to make such cut against anvil or stop face 91 with the result of such cut shown in FIG. 17. In this step, the end 92 is pinched together, which presents a substantial thickness of surface for a subsequent welding step. The pinched formation extends across the cut made, and it is to be noted that such pinched formation includes a substantial length of remaining length 80. The pinched length of remaining length 80 includes a straight peripheral length 93, FIG. 17, which has an annular width to be presented, for welding, to the flange edges forming the V-notch in blade 31. Thus, in the welding step, an annular or circumscribing width of length 93 and the V-notched edges of flanges 37, 38 physically engage to provide the basis for a suitable and strong weld between shank and blade.

STEPS FORMING THE WORKING HEAD

FIGS. 18-25 illustrate steps taken in the fabrication of blade 31. A length of flat, metal stock material 100, having a width suitable in the formation of a desired width for blade 31 is presented to a flat surface 101 of a conventional shearing apparatus, FIG. 18. The one end of stock 100 is caused to abut against a stop 102 mounted above surface 101 at a distance from a shearing tool edge 104 and which distance determines the general length for blade 31. The cutting edge 104 of the shearing tool is caused to descend upon stock material 100, to cut through same and thereby form a flat plate or blank 105, FIG. 19.

Blank 105 then is presented, FIGS. 20, 21, to formers and punches to form front edge 39 and a V-notched rear edge 108, FIG. 21. FIG. 20 illustrates the positioning of punches 109, 110 which act with their corresponding formers (not shown) of a conventional die machine to shape or configure edges 39, 108, FIG. 21.

The next step is to form flanges 37, 38, FIGS. 22, 23, at the rear edge 108 of blank 105. Blank 105 is set into a conventional die apparatus, FIG. 22, uopn a surface 112 of a female die having a former surface 113 for forming such flanges therein, blank 105 being shown in phantom on surface 112. A forming die on punch 114 is caused to descend thereon, so that the rear of the blank snaps into former surface 113 of the female die, and to thereby form flanges 37, 38, FIG. 23, as punch 114 punches or bends the rear of blank 105 to form such flanges.

Blank 105 then is subjected to a step, FIG. 24, for bending it along its longitudinal axis to form a flaring trough and dish effect in blade 31, FIG. 25. A suitably dimensioned circular solid metal former or punch 117 is caused to descend on blank 105 seated across an opening formed between two plates 118, 119, FIG. 24, of a conventional apparatus. The one edge of flat blank 105 sits in a position abutting a stop block 120 attached to plate 119, so that the effect of the descent of bar 117 acts along its longitudinal axis. In this step, flanges 37, 38 rotate towards one another, i.e., the V-notch formed in an earlier step becomes smaller but does not close off completely. A small space remains, suitable for use in welding shank 32 to blade 31. The rear end of bar 117 is pitched (below a horizontal line) in order to descend a greater distance at the heel of blade 31 than at its working edge 39. By such a pitch, a flaring trough 40 is created, shallower at edge 31, arrow b, FIG. 3, and deeper at its heel, arrow c, FIG. 3. Furthermore, the flare becomes of greater width as it approaches edge 39 from flanges 37, 38, best seen in FIG. 2. In another sense, the configuration of the V-notch between flanges 37, 38 tells the extent of descent and pitch for bar former 117 that can be utilized for a blade 31, without such flanges physically abutting one another.

Blade 31 now is heat treated, for hardening purposes, prior to welding to shank 32, as at 33, 34, FIGS. 1-4. Thereafter, taper 35t of handle 35, FIG. 7, is inserted into and past hub 43, to be secured to shank 32 by means of rivet 36 extending through shank and handle taper.

The operation of tool 30 is well known in the art. This disclosed embodiment of the invention takes the form of a narrow trenching shovel, one which can readily remove soil, debris and like substances from narrowly-defined trenches. The operator of tool 30 thrusts the working edge 39 into such substances, by means of grasping handle 35 with his hands, and causing a motion for tool 30 by which its blade 31 picks up and retains such substances. Thereafter, by other suitable and known motion for tool 30, such substances are removed from the trench, to be discharged thereafter from blade 31, thereby making ready again the use of tool 30 in the trench.

The assembly of tool 30 is apparent from the above description, however, to summarize, after fabrication of shank, blade and handle (the latter's tapering portion 35t formed, i.e.), the shank is welded to the blade, generally along the latter's longitudinal axis and at its rear contiguous, to its flanges. Thereafter, the handle is attached by a rivet to the shank after the former is introduced to the shank through its hub.

The shank is fabricated from hot or cold rolled steel tubing or other suitable material. When such tubing is not seamless, the seam is to be found in the buckled portion formed in the process of making the shank, such as, for example, as at bp, FIG. 5a.

Commercial 4130 steel is a suitable material for blade 31, the blade 31 being heat treated in conventional fashion prior to welding it and shank 32 together. The handle 35 is of suitable wooden material. With respect to the tapering length 35t of handle 35, from a practical economic stature, it is of a truncated nature, however, its surface may be trimmed to conform to the inner walls of hub 43 and retained straight portion 45 of shank 32. FIG. 6 shows such a conformity, this FIGURE being slightly modified from a true cross-sectional view taken on line 6—6 of FIG. 3, by reason of no annular air space between the wood and the interior wall of metal tubing 45 and as shown in FIG. 6.

The methods of fabrication for the elements forming blade 31 and for shank 32 include maintenance of symmetry about their respective longitudinal axes throughout the manufacturing steps.

The invention comprehends alternative constructions for and steps in the manufacturing of shank 32 or tool 30, depending upon the nature of the end product desired to be made. For example, hub 43 need not be included in each shank comprehended within the scope of the invention. Pinching of the lower end 48 of shank 32 need not be included in the event buckled lower end 48 is secured to a blade or working head 31 where the plane of buckled lower end 48 is adequate itself to provide a lift to tool 30 in the grasp of an operator, i.e., no cut along an angle A being necessary. The preferred embodiment includes a complete pinching together of end 48. Further, pinching of end 48 may occur in a step separate from the step of cutting such end at an angle A, or where pinching is desired but no cutting at an angle A is desired, although the preferred embodiment of the invention provides for these steps to be simultaneous in occurrence.

INDUSTRIAL APPLICABILITY

The applicability of tool 30 extends to any use involving digging into and in the earth. As examples of uses, the tool is used in construction work, maintenance, landscaping, gardening, sprinkler and irrigation purposes, utility (underground gas, electric, and water lines) purposes, for clean out or any other digging function.

Various changes and modifications can be made without varying from the invention or its scope, as set forth in the appended claims.

What I claim as patentably distinct is:

1. A shank for a tool or the like comprising
   a single walled hollow member having a longitudinal axis extending between an upper end and a lower end therefor,
   a tubular portion formed integrally in said member extending from its upper end along its longitudinal axis,
   a buckled portion having generally a figure-eight outline in cross-sectional appearance and including no more than one curved segment extending from said tubular portion towards the lower end, and
   a remaining length in the buckled portion extending from the one curved segment to such lower end.
2. The shank of claim 1 including means in said tubular portion for connecting said shank to a handle.
3. The shank of claim 1 or claim 2
   wherein said buckled portion is relatively pinched at such lower end.
4. The shank of claim 3, such lower end having a cut along an angle including the normal to the longitudinal axis of said member at such lower end.
5. The shank of claim 4 including
   an expanded hub formed on said member contiguous to its upper end, said tubular portion including a retained length separating said expanded hub from said buckled portion.
6. The shank of claim 1 or claim 2 including
   an expanded hub formed on said member contiguous to its upper end, said tubular portion including a retained length separating said expanded hub from said buckled portion.
7. The shank of claim 3 including
   an expanded hub formed on said member contiguous to its upper end, said tubular portion including a retained length separating said expanded hub from said buckled portion.

* * * * *